United States Patent [19]

Senour

[11] 3,708,026
[45] Jan. 2, 1973

[54] DIGITAL BATCHING
[75] Inventor: Donald A. Senour, Carlisle, Mass.
[73] Assignee: BLH Electronics, Inc., Waltham, Mass.
[22] Filed: July 1, 1971
[21] Appl. No.: 158,688

[52] U.S. Cl. .................. 177/60, 177/70, 177/81, 177/122
[51] Int. Cl...G01g 13/04, G01g 13/12, G01g 23/365
[58] Field of Search............177/60, 70, 81, 122, 123

[56] References Cited

UNITED STATES PATENTS

| | | |
|---|---|---|
| 2,868,491 | 1/1959 | Thorsson et al. ........................177/81 |
| 3,106,974 | 10/1963 | Williams................................177/70 |
| 3,204,711 | 9/1965 | Boadle et al............................177/70 |
| 3,247,916 | 4/1966 | Chilton..................................177/81 |
| 3,260,320 | 7/1966 | Clamp...................................177/70 |
| 3,511,412 | 5/1970 | Wolfenden et al. .....................177/70 |

Primary Examiner—Robert S. Ward, Jr.
Attorney—James E. Mrose et al.

[57] ABSTRACT

Automatic precision control of high-speed filling and emptying operations, such as those in which a liquid is admitted into or discharged from a batch, is provided by a combination of a weighing system and associated electronic digital circuitry which regulates these operations in accordance with changes in instantaneous batch weight relative to stored information concerning initial weight and which further both reduces or "dribbles" the rate at which these operations proceed just prior to their completions and anticipates and accounts for so-called "in-flight" amounts of material remaining temporarily in transit.

22 Claims, 2 Drawing Figures

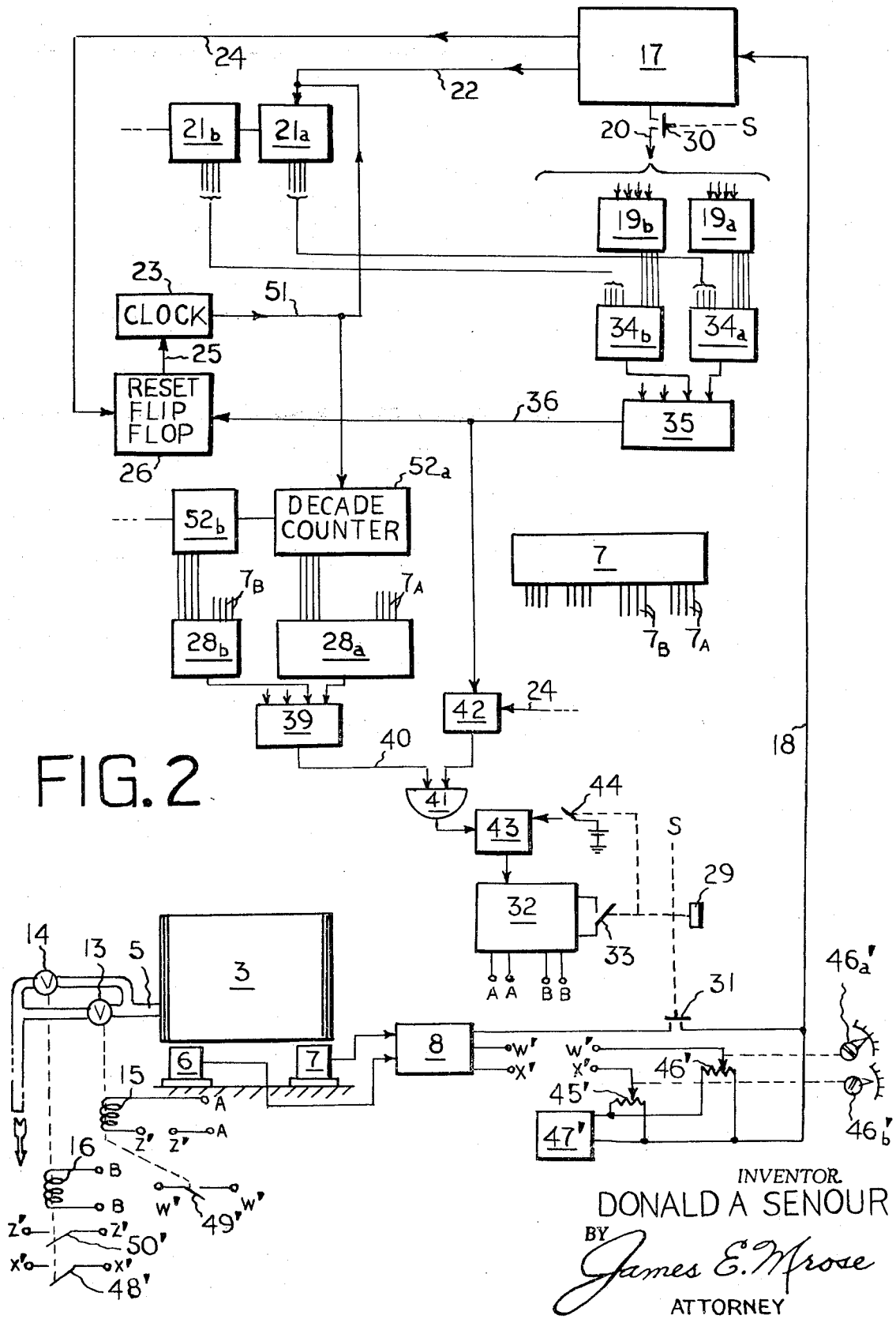

DIGITAL BATCHING

BACKGROUND OF THE INVENTION

The present invention relates to improvements in automatic control of batches of material such as fluent materials in process-control systems, and, in one particular aspect, to novel and improved electronically-regulated batching apparatus wherein main and venier valves are electrically actuated in accord with unique automatic dictates of digital electronic circuitry, the latter being responsive to both instantaneous and stored weight data and to operator-set data related to the desired amounts of batches and the residual amounts of material which necessarily remain in transit after valve operations.

It is of course well known to regulate the flows of liquids or other fluent materials in various mixing or reaction processes, or in simple batch-dispensing operations. This may be accomplished essentially by hand, for example, through planned manipulations of valves or the like. Human errors can have very wasteful consequences, and the demands upon the skill and constant attention of operators tends to make such activity tedious, costly and imperfect. It is for such reasons that automatic controls are attractive instead, although, even then, the requirements for precision are often so severe that the simple reading and setting of analog-type instruments and controllers can involve excessive errors. Further, in many applications the filling or unloading operations must proceed at very high rates, through large valves and pipelines, for example, and the so-called "in-flight" quantities of material remaining in such pipelines upon closures of the valves represent substantial error in the batching.

Accordingly, the present teachings are centered about batching systems and practices in which the measurement and setting data are caused to be of digital character and the needed automatic control is effected principally by way of associated high-speed solid-state digital circuitry. As batching takes place, initial stored weight-measurement data, and instantaneous measurement data, and preset batching data, and pre-set "offset" data, are in control of a change in flow rate which is established just prior to completion of the operation. Residual or "in-flight" quantities of the fluent material being batched are automatically taken into account by the digital circuitry, which dictates an anticipatory shut-off of the lower rate of flow at a time allowing precisely for the subsequent discharge of the predetermined relatively small "in-flight" quantity, whereby the batching is not only rapid but highly exact as well.

SUMMARY

The present invention is aimed at improvement of automatic batching of fluent materials into and out of locations, such as a tank, where the weight of material at such locations may be accurately measured and characterized in digital form quickly and on a substantially continuous basis. In the case of a tank or other container served by a filler and/or drain pipeline equipped with appropriate valving, the weight of fluent material is conveniently and rapidly determined by associated load cells, or by a weighing platform on which the container is placed, having electrical strain gages of known form which develop the weight-related electrical outputs. These outputs, in analog form, are in turn translated into digital binary-coded form, and are also preferably displayed to the operator in unequivocal digital terms, in a conventional digital weight-indicating instrument such as a known dual-slope integrating instrument in which an analog input signal is periodically first integrated for a given time and characterizing pulses are then clocked during the succeeding period in which the integrated voltage is allowed to decrease to a reference level. The weight characterized by such an instrument is stored in digital form for reference purposes during a batching control operation, at the very outset of such an operation, the operator having manually set into the system, in digital form, the weight of material to be batched in or out, as well as certain "offset" information which instructs the system to change the rate of flow at a predetermined point in the batching cycle and to take into account any residual "in-flight" material. At commencement of the control operation, the aforesaid storage occurs before any weight change can take place as the result of a main-valve opening, the latter also being caused by the operator's initiation of the batching cycle. Thereafter, the digital characterizations of progressively different weights, by the same instrument, are digitally compared with the stored initial weight, as modified by the offset, and resulting differences are in turn compared with the pre-set information concerning weight of material to be batched. When the latter comparison signifies that the desired batching, less a certain amount of the offset, has been accomplished, a simple gating circuit causes the valve to be turned off and an auxiliary or vernier valve to regulate the ongoing flow at a reduced rate for a further period in the cycle until it is also closed as the result of effects of the remaining offset amount. On completion of the cycle, including inescapable drainage of the small residual amount of material in the batching pipeline, the weight of batched material will be precisely related to the value initially set by the operator.

Accordingly, it is one of the objects of the present invention to provide novel and improved apparatus and practices for precision control of batching operations, in which instantaneous weight of a batch is compared with initial weight and the differences are referenced to a desired weight value and to offset weight values for effecting actuations of main and vernier flow controllers.

Another object is to provide unique automatic batching control apparatus wherein digital circuitry promotes precise and high-speed regulations of flow by comparing instantaneous weight and initial weight of a batch and referencing their differences to a programmed end weight.

A further object is to provide an automatic batching system in which digital data from a batch weight-measuring instrument associated with a batch tank or the like is digitally stored and referenced to instantaneous and programmed weights to establish flow control, and in which certain offsets characterizing needs for reduced flow rates and anticipations of residual flows are advantageously taken into account via simple analog modifications of input to the weight-measuring instrument.

Although the features of this invention which are considered to be novel are expressed in the appended claims, further details as to preferred practices, as well as to further objects and advantages, may be most readily comprehended through reference to the following description taken in connection with the accompanying drawings.

BRIEF DESCRIPTION OF THE DRAWINGS

FIG. 2 is a partly schematic, pictorial and block-diagrammed representation of the portions of an improved automatic batching system employed in a batching-out operation.

DESCRIPTION OF THE PREFERRED EMBODIMENTS

Figure 1:
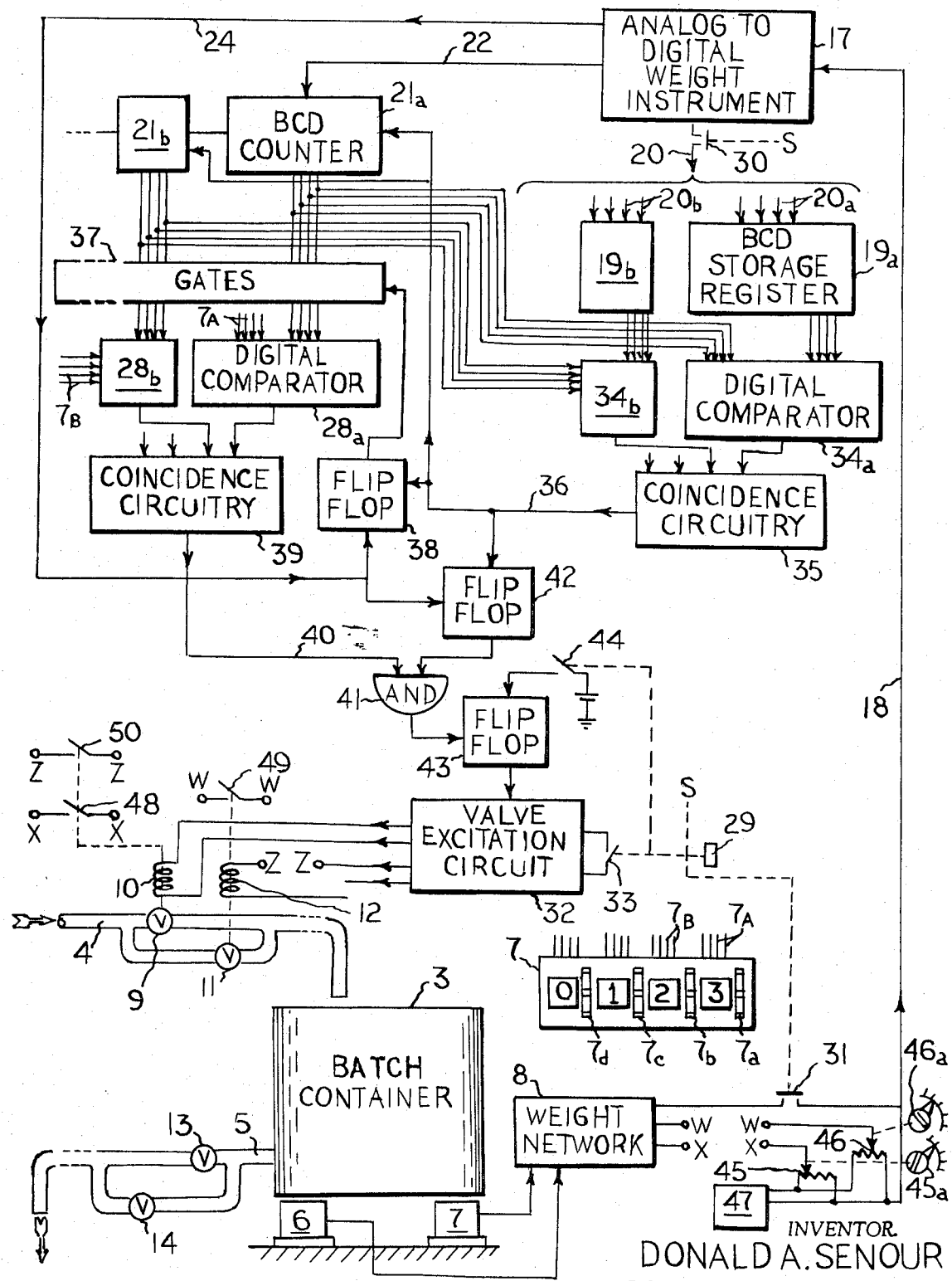
FIG. 1 is a partly schematic, pictorial and block-diagrammed representation of the portions of an improved automatic batching system employed in a batching-in operation.

The system portrayed in FIGS. 1 and 2 is intended to control automatically, with a high degree of accuracy and reliability and in minimized time, the intake and outlet of predetermined batches of fluent material associated with a batch container, such as the illustrated liquid-holding tank 3. In practice, the container 3 may admit more than one material, for mixing or reaction processes, although, for purposes of clear simplified description, only a single inlet conduit or pipeline 4 is shown in FIG. 1. Outlet conduit 5, and the associated arrangement of the control circuitry as it appears in FIG. 2, may be unnecessary in certain cases, where the batching is essentially a container-filling type operation, for example. Tank 3 is supported by electrical weight-responsive equipment, shown specifically as a plurality of load cells, 6, 7, of known construction wherein the weight-related deformations of load-transmitting elements are accurately translated into electrical signals by electrical strain gages and their cooperating weight network 8, such as a bridge circuit with appropriate excitation and output accessories. Inlet or batching-in conduit 4 includes at least a main valve, 9, which may be rendered fully closed and opened electrically, by a solenoid or equivalent quick-operating electrical actuator 10. In addition, the same conduit preferably includes a vernier or fine-control valve 11, situated to establish a reduced rate of flow in relation to that governed by main valve 9, and having a like cooperating electrical actuator 12. In outlet conduit 5, the main valve 13 and vernier valve 14 are functionally the same as valves 9 and 11, as are also their cooperating electrical actuators 15 and 16, respectively (FIG. 2). In the descriptions which follow, the main and auxiliary valves for each conduit are considered to be in parallel and to be oppositely closed and opened, although it should be understood that comparable results and functional equivalency may be realized with specifically different valving arrangements, such as one wherein a substituted single valve has two predetermined different opening conditions, or wherein two valves of either the same or different flow ratings are operated together to yield a high flow rate and one is used separately to establish a desired low flow rate.

Neglecting for the moment certain switched injections of analog offset signals onto the analog electrical output of weight network 8, a conventional determination of the weight of container 3 and its contents is accomplished by a known form of analog-to-digital weight instrument 17 having the output of network 8 applied to it by way of coupling 18. Preferably, such an instrument provides a digital display of weight (not illustrated) for the operator, but, in any event, the binary-coded digital information concerning each digit of the measured weight is present and is, in this system, applied to an appropriate one of a plurality of binary-coded storage register stages, 19a, 19b, etc., via couplings 20, 20a, 20b, etc. The illustrated system is assumed to operate on the basis of four digits, although more can obviously be used, and therefore other register stages and the like, not repeated in full in the drawings, are of course involved and will be understood by those skilled in the art. Instrument 17 is conveniently of the known so-called "dual-slope" type, wherein, periodically, the analog input is integrated for a first predetermined short clocked period, and, in a second period immediately following, the previously integrated signal is permitted to discharge down to a predetermined low reference level, such as a network ground or zero level. An internal clock, or pulse-generating oscillator, produces a train of pulses during this second or "discharge" period, until associated logic circuitry commands it to stop, which occurs when the aforesaid reference level is reached. Slope of the decreasing voltage is constant, and the time to reach the reference level is thus precisely related to the previously-integrated voltage, as is also the number of pulses developed by the aforesaid oscillator during the said second period. The cycling is at a very high rate, with a significant third period remaining between the end of each second period and the automatic commencement of the next first period. In the system under discussion, the pulses from the aforesaid oscillator are applied to the first stage of a binary coded decade counter array including stages 21a, 21b, etc., via coupling 22. Instrument 17 further includes a customary provision for developing a distinctive pulse at the moment each second period ends, i.e., when there is a "crossover" at the reference voltage level, and, in the batching-out arrangement of the system under discussion, shown in FIG. 2, each of said distinctive pulses is applied in starting control of an auxiliary pulse-generating clock 23 via couplings 24 and 25 and through reset flip-flop gating circuitry 26, for purposes considered in more detail later herein. U.S. Pat. No. 3,368,149, issued Feb. 6, 1968, contains descriptions of dual-slope integrating instrumentation and may be referred to for further details, if desired. Instrument 17 may be the Model 8000 instrument made available by BLH Electronics, Inc., Waltham Mass., for example.

Before commencing operation of an automatic batching-in process with the system as connected and arranged in FIG. 1, the supervising attendant first manually adjusts a digital setting of the desired batch weight in a known form of multidigit "switch" 7. An appropriate switch for that purpose is EECo. Part No. 1776026V, and includes thumbwheels 7a, 7b, etc., which cause the desired digits to be both displayed visually and coded electrically in binary form in electrical output leads 7A, 7B, etc., associated with these digits. These leads immediately apply the batch-setting data to digital comparator stages 28a, 28b, etc., which, for example, may comprise Motorola Semiconductor Products Inc. Part No. MC 771 P. Next, the attendant starts system operation by momentarily depressing a start button 29. Simultaneously therewith, the mechanical connection S—S momentarily closes switch 30 in coupling 20, thereby applying to storage register stages 19a, 19b, etc., a digital encoding of the then-existing measurement of weight of the tank 3 made via instrument 17. Instrument 17 is at that moment connected to respond to weight network 8, by way of coupling 18 and connections through a switch 31 which is momentarily closed along with start button 29. Both valves 9 and 11 are normally closed as the batching is about to commence. Also simultaneously with actuation of start button 29, a simple analog-type valve excitation circuit, 32, including an electrical relay which responds to the button actuation, as the result of closure of a switch 33, for example, causes the relay to energize main-valve actuator 10 and open main valve 9 fully. Thereupon, the liquid to be batched in starts to flow through pipeline 4 at a high rate, and thence into the tank 3. Weight of tank 3 then increases, but, before it can, the storage of data concerning its initial weight, in register stages 19a, etc., must already have occurred; this is assured because the measurement and storage take place exceedingly fast in the related electronic processing, whereas the simple quick opening of the electromechanical valve 9 is necessarily relatively slow at best.

Fully automatic control to shut-off of the flow follows the actuation of start button 29. During each of the aforesaid "second" or down-integration periods in cycling of instrument 17, counter stage 21a is supplied with pulses from the instrument's clock-pulse oscillator, over coupling 22, and that counter therefore counts pulses in parallel with instrument 17. Known-form digital comparator stages 34a, 34b, etc., are connected, as shown, to compare the output of counter stages 21a, etc., which represents instantaneous weight as it progressively increases with flow into tank 3, with the stored initial weight data in stages 19a, etc.; each time there is coincidence in the thus-compared inputs, the known-form coincidence circuitry 35 produces a pulse which it applies to counter 21a, etc., via coupling 36, as a reset signal. Therefore, counter 21a, etc., is reset to zero, or cleared, each successive time that the "countdown" of clock pulses during the aforementioned "second" periods in instrument 17 exceeds the level characterized by the initial stored weight information in register 19a, etc. This does not mean that the number of pulses in the countdown of clock pulses will not in fact exceed the said level, because it does for every measurement cycle of instrument 17 while the tank weight is being increased from the initial weight during batching-in; instead, what it means is simply that, during each such measurement cycle, after reset of counter 21a, etc., occurs, the further counting above and beyond the reset level, by that same counter, 21a, etc., is only of the pulses characterizing the increase of tank weight above the initial weight. The digital counting related only to that increase in weight is to be compared with the digital batch weight data which the attendant had earlier set into setting switch unit 7, by way of digital comparator stages 28a, 28b, etc., and, for that purpose, the output of counter 21a, 21b, etc., must be inhibited from appearing at comparator stages 28a, 28b, etc., until after each occurrence of reset of counter 21a, 21b, etc. Known-form gates, characterized by gates 37, serve that stated purpose, the applied outputs from leads 21A, 21B, etc., being passed to comparator stages 28a, 28b, etc., only when a flip-flop 38 or the like applies a correct polarity of gating signal, in response to each reset pulse appearing in coupling 36. The gating is closed appropriately by the aforementioned "crossover"-condition pulses appearing in coupling 24 from instrument 17. Accordingly, comparator stages 28a, 28b, etc., witness only the count representing increased tank weight, and, at some point, that count coincides with the digital setting of desired batch-in weight; the main valve 9 should then be shut off, of course, again continuing to ignore certain offset factors which are considered later herein. The said valve shut-off occurs immediately upon the sensing of the coinciding count and setting, by known-form coincidence circuitry 39, which is like coincidence circuitry 35, and which produces a related coincidence output pulse in coupling 40. That output pulse is conveniently used to change the control condition of the valve excitation circuit 32 which has until then been applying excitation to valve actuator 10 to keep main valve 9 open, by way of tripping a relay, for example. However, reliable isolation from spurious pulses is desirable in the valve-closing step, and, to that end, the coincidence pulse from coupling 40 is passed through an And circuit 41 only when the output from a flip-flop 42 is of proper polarity. Earlier-mentioned reset pulses from the aforesaid coupling 36 conveniently set that flip-flop to the correct state during each measurement cycle, being reversed in state to block passage of noise pulses, etc., after each "crossover"-condition pulses is applied to it from the aforesaid coupling 24. A further flip-flop, 43, responds to the passed coincidence pulse and "holds" the valve excitation circuit in a condition wherein it maintains main valve 9 closed, until the start button 29 is again momentarily actuated by the attendant and causes momentary switch 44 to apply a change-of-state pulse to flip-flop 43.

Once the main valve has been reclosed upon completion of the sequencing described above, the system stands ready for another batching operation. The amount of fluent material batched into container 3 is theoretically correct, and may be exact enough for some purposes. However, in other instances, the rate of flow through main valve 9 and conduit 4 may have to be so great that it is difficult to halt all at once, and, even if it were, the residual amount of material left "in flight" in the pipeline length downstream of that valve would be relatively large, and would subsequently drain itself into tank 3 with consequent unmeasured and unaccounted-for further increase in weight of the batched-in material. Errors from such causes are substantially eliminated by introducing one or both of two "offset" controls, one causing the main valve to be shut off while a lower-rate auxiliary or "dribble" valve is caused to carry the flow just prior to the end of the batching-in operation, and the other representing the known empirically-determined or closely-estimated weight of the residual or "in-flight" material remaining in the pipeline downstream of the final valve closure site, whether of the main or dribble valve, depending upon whether the latter is employed. Advantageously, both of these offset factors are dealt with as simple analog electrical signals, rather than handled digitally by way of relatively complicated and costly circuitry which that would entail. Simple adjustable potentiometers, 45 and 46, excited by a convenient source 47, develop voltages related to the two "offset" weight values, each preferably having a tap-adjusting shaft which is associated with a graduated indicator, 45a and 46a, respectively. The voltages from these potentiometers are compatible with those from weight network 8, such that instrument 17, to which they are fed along with the weight-measurement input voltage, accepts them as though they represented actual measured weight. The same is true of the system responding to instrument 17. Conveniently, connection of one or both of these "offset" voltages into the system is by way of switches 48 and 49, of relay-contact types, which are respectively articulated by main and dribble valve actuators or coils 10 and 12, the indicated switch connections X-X and W—W being made of course. When main-valve actuator coil 10 is forced by circuit 32 to an excitation state representing closure of that valve after it has been opened for batching-in, the offset voltage applied beforehand by the attendant's adjustment of potentiometer 45 will already have caused the system of FIG. 1 to "fool" itself by considering that the batched-in weight was greater than was actually the case, i.e., the main valve 9 will have closed earlier than would otherwise have happened. That earlier time is varied according to need, and is in terms of main valve closure when the batching-in is at a selected number of pounds short of the poundage set on thumbwheel "switch" 7. "Dribble" valve 11 is then preferably opened, its acuator coil 12 being excited by circuit 32 to produce that dribble valve open state simultaneously with the change effecting closure of main valve 9, the latter change having enabled the dribble valve actuation by effecting closure of switch 50, the circuit connections Z—Z being made of course. At the same time that dribble valve 11 is opened in the aforesaid manner, the relay-type switch 49 associated with its coil 12 is closed, and, through connections W—W, the further offset voltage from potentiometer 46 is applied to input of instrument 17. The latter offset voltage further "fools" the system into considering that it is further along in the batching-in process than it actually is, and thus a further coincidence pulse appears in coupling 40 a predetermined number of pounds short of the poundage set in unit 7. That further pulse effects change in the excitation of actuator coil 12 for the dribble valve 11, by way of circuitry 32, causing the latter valve to close. Thereafter, the relatively small "in-flight" quantity of material left downstream of valve 11 in pipeline 4 will drain into tank 3, bringing its end increase in batch weight to substantially the precise value prescribed by the setting of unit 7. As has been indicated, the proper adjustment of potentiometer 46 to effectuate the precise end increase in weight may be either calculated or determined empirically.

Storage register stages 19a, 19b, etc., may be in the form of the Quad Latch Part Sn 7475 N marketed by Texas Instrument Incorporated, and Decade Counter 21a, 21b, etc., may be that same company's SN 7490 N, for example. Digital comparator 34a, 34b, etc., like comparator 28a, etc., may comprise a so-called "Quad Exclusive 'Or' Gate," identified by Part No. MC 771 P of Motorola Semiconductor Products Inc., for example.

When material is automatically batched out of a container, such as tank 3 in FIG. 2, the same system is switched to the batching-out arrangement represented there. It will be recognized that the system is modified only in certain respects, relative to its arrangement in FIG. 1, and, except for the differences next specified, the components, interconnections and operating characteristics are as described with reference to FIG. 1. On commencement of batching-out, with the desired end weight decrease having been set in unit 7, the start button 29 is depressed and the tank weight is first stored in register stages 19a, 19b, etc., the switches 30 and 31 also having been momentarily closed for that purpose. Almost immediately thereafter, main valve 13 is opened because of response of its actuator coil 15 to switch 33 and valve excitation circuit 32, and fluent material begins its flow out of tank 3 at some desired relatively high rate. As in the batching-in operation described hereinabove, counter stages 21a, etc., counts oscillator clock pulses applied via coupling 22 from instrument 17, during each "second" or countdown period in the measurement cycles of that instrument. Upon completion of each countdown or "second" period, a pulse corresponding to each "cross-over"-condition pulse from instrument 17 is applied to an auxiliary clock pulse generator, 23, via couplings 24 and 25 and the reset flip-flop 26, causing that auxiliary clock to produce a train of pulses during each of the aforementioned "third" periods of the instrument cycling. Auxiliary clock 23 may be like the clock pulse generator in instrument 17, and preferably develops pulses at substantially the same rate. Pulses from auxiliary clock 23 are fed via coupling 51 into counter stages 21a, etc., after the pulses in coupling 22 cease, and they are also fed to Decade Counter stages 52a, 52b, etc., during the same "third" periods; the latter counter stages may comprise Texas Instruments Incorporated Part SN 7490 N, for example. Digital comparator 34a, 34b, etc., compares the initial stored weight data, in digital form, with the digital output of counter 21a, 21b, etc., the latter having characterized the pulse count from coupling 22 and from clock 23 during each cycle. Coincidence circuitry 35 produces a pulse whenever there is coincidence in the outputs of stages 19a, 19b, etc., and stages 21a, 21b, etc., this pulse being applied to reset flip-flop 26, over coupling 36, to turn off clock 23. When batching out commences, such a pulse is produced in the first cycle and there is no output from the auxiliary clock 23, because the batch weight has not changed. In subsequent cycles, as material flows out of the tank 3 and its measured weight decreases progressively, the coincidence pulse occurs later and later in the successive cycles, and, accordingly, clock 23 develops more and more pulses in the "third" periods of such successive cycles. Counter stages 52a, 52b, etc., therefore produce a higher digital reading during the successive cycles, until, ultimately, its reading corresponds to that of the batch-setting reading from unit 7. Digital comparator 28a, 28b, etc., responds to the latter condition by causing coincidence circuitry 39 to develop an output pulse in coupling 40, and, in turn, the valve excitation circuit 32 causes the main valve 13 to be closed, in a manner corresponding to that described for the main inlet valve of FIG. 1. Dribble valve 14 may be actuated to open when the main valve 13 closes prior to end of the batching-out operation, and to close at another point just short of occurrence of the desired end batch-out weight, in manners corresponding to those described for the batching-in arrangement of FIG. 1. In that connection, the potentiometers 45' and 46', functionally like potentiometers 45 and 46, are instead simply caused to produce offset voltages of polarity opposite to that of potentiometers 45 and 46, by source 47', such that the system "fools" itself into considering that more material has already been batched out than was actually the case. Other parts distinguished by single-prime accents in FIG. 2 correspond functionally to those of like number in FIG. 1, particular note being invited in relation to the switches and connections associated with the actuators for the main and dribble valves.

It should be understood that the preferred embodiments and practices of this invention have been depicted and described for purposes of disclosure rather than limitation, and that those skilled in the art may introduce various modifications, combinations and substitutions without departure from the spirit and scope of the invention as set forth in the appended claims.

What I claim as new and desire to secure by Letters Patent of the United States is:

1. Batching apparatus for controlling the weight of a fluent material batched in relation to a container therefor, comprising means for electrically storing data representing initial weight of material and its container at the outset of a batching operation, adjustable means for electrically characterizing a weight of the material to be batched, means for comparing data stored by said storing means with data characterizing instantaneous weight of the material and its container, means responsive to said comparing means for electrically characterizing differences between said initial and instantaneous weights, means for comparing the electrical characterizations of said differences and said weight to be batched and producing an output signalling occurrence of coincidence therebetween, electrical means for actuating controller means for controlling the flow of the material in relation to the container, starting means for first initiating storage of said data by said storage means and then operating said electrical means to actuate the controller means to an open condition passing the flow of material, and means applying said output to said electrical means to operate said electrical means to actuate the controller means to a closed condition restricting the flow of material.

2. Batching apparatus as set forth in claim 1 wherein said adjustable means characterizes weight to be batched into the container, and wherein said means electrically characterizing said differences produces electrical characterizations only of instantaneous weight-characterizations in excess of the weight representation by said stored data.

3. Batching apparatus as set forth in claim 1 wherein said adjustable means characterizes weight to be batched out of the container, and wherein said means electrically characterizing said differences produces electrical characterizations of weight which are in excess of said instantaneous weight characterization and which when added to said instantaneous weight characterization totals the representation of initial weight by said stored data.

4. Batching apparatus as set forth in claim 1 further including means for producing at least one offset in one of said weight characterizations and representation, equal to a characterization of a number of pounds of the material, and wherein said means comparing said data compares the data including said offset in one of them, whereby said apparatus effects closure of the controller means at a predetermined time in the batching operation short of the time when closure would be effected in absence of said offset.

5. Batching apparatus as set forth in claim 4 wherein said offset-producing means produces said offset in characterizations of said instantaneous weight.

6. Batching apparatus as set forth in claim 2 further including means producing a positive offset in characterizations of said instantaneous weight, said positive offset causing said characterizations of instantaneous weight to be higher by a predetermined number of pounds than is actually the case.

7. Batching apparatus as set forth in claim 3 further including means producing a negative offset in characterizations of said instantaneous weight, said negative offset causing said characterizations of instantaneous weight to be lower by a predetermined number of pounds than is actually the case.

8. Batching apparatus as set forth in claim 5 wherein the controller means includes means for controlling the flow of material at relatively high and relatively low first and second rates respectively, wherein said offset-producing means produces first and second offsets in characterizations of said instantaneous weight and further includes means for sequentially producing said first offset during the open condition of said first-rate controlling means and producing said second offset upon occurence of the closed condition of said first-rate controlling means.

9. Batching apparatus as set forth in claim 8 wherein said first-and second-rate controlling means comprise electrically-actuated fluid valves.

10. Batching apparatus as set forth in claim 1 wherein said means for storing said data representing initial weight comprises digital storage means, wherein said adjustable means characterizes the weight of material to be batched in digital encoding, wherein said means for comparing comprise digital comparators, means digitally encoding said data characterizing the instantaneous weight, wherein said means producing said output comprises digital coincidence circuitry producing an output pulse characterizing said coincidence, and wherein said means comparing data includes digital coincidence circuitry producing a coincidence pulse upon occurrence of coincidence between digital data characterizing instantaneous and stored initial weights.

11. Batching apparatus as set forth in claim 10 wherein said means digitally encoding said data characterizing the instantaneous weight repeatedly performs said encoding periodically and at a high repetition rate relative to expected significant changes in the instantaneous weight.

12. Batching apparatus as set forth in claim 10 further including an instrument responsive to weight-related analog electrical input signals and periodically producing a digital characterization of instantaneous weight, said storing means being responsive to digital characterizations by said instrument, and said digital encoding means being responsive to said digital characterizations.

13. Batching apparatus as set forth in claim 12 wherein said instrument comprises a dual-slope integrator periodically integrating said input signals and periodically producing weight-related trains of clock pulses while each integrated signal is discharged to a regerence level and further producing crossover pulses each time the discharged signals reach the reference level.

14. Batching apparatus as set forth in claim 13 further including a container for the material, weighing means supporting said container and producing analog electrical output signals representing weight of the container and material therein, and means applying said analog output signals to said instrument as input thereto.

15. Batching apparatus as set forth in claim 14 further comprising conduit means coupled with said container for conducting flow of the material in relation to said container, and wherein said controller means controls flow of the material through said conduit means.

16. Batching apparatus as set forth in claim 12 further comprising means for producing at least one analog offset signal, and means for applying said offset signal as input to said instrument together with said weight-related analog input signals.

17. Batching apparatus as set forth in claim 16 wherein said said means for producing said analog offset signal comprises adjustable potentiometer means.

18. Batching apparatus as set forth in claim 17 wherein said potentiometer means comprises two potentiometers each producing a different analog offset signal, and wherein said means applying said offset signal as input applies the offset signal from one of said potentiometers as said input and applies the offset signal from the other of said potentiometers as said input upon occurrence of said output pulse characterizing said coincidence.

19. Batching apparatus as set forth in claim 12 wherein the controller means includes means for controlling the flow of material at relatively high and relatively low first and second rates respectively, wherein said offset-producing means produces first and second analog offset signals and further includes means for sequentially producing said first offset signal during the open condition of said first-rate controlling means and producing said second offset signal upon occurrence of the closed condition of said first-rate controlling means.

20. Batching apparatus as set forth in claim 13 wherein said means digitally encoding said data characterizing the instantaneous weight comprises a digital counter responsive to said periodic digital characterization of instantaneous weight by said instrument.

21. Batching apparatus as set forth in claim 20 including means resetting said digital counter upon occurrence of each said coincidence pulse, and means gating the counted data in said digital counter to said digital comparator in said means for comparing data in response to each said coincidence pulse.

22. Batching apparatus as set forth in claim 20 including a pulse-generating clock, means triggering said clock to commence production of pulses upon occurrence of each of said crossover pulses and to cease production of pulses upon occurrence of each said coincidence pulse.

* * * * *